(12) United States Patent
Dhersin

(10) Patent No.: US 8,563,796 B2
(45) Date of Patent: Oct. 22, 2013

(54) ENCAPSULATING COMPOSITION FOR THE STORAGE OF WASTE THAT IS TOXIC TO HEALTH AND/OR THE ENVIRONMENT, WHICH IS DEVOID OF AN AROMATIC AMINE HARDENING AGENT

(75) Inventor: Christine Dhersin, Sailly Labourse (FR)

(73) Assignee: CCP Composites, Courbevoie (FR)

( * ) Notice: Subject to any disclaimer, the term of this patent is extended or adjusted under 35 U.S.C. 154(b) by 0 days.

(21) Appl. No.: 13/001,973

(22) PCT Filed: Jun. 30, 2009

(86) PCT No.: PCT/FR2009/051266
§ 371 (c)(1),
(2), (4) Date: Dec. 29, 2010

(87) PCT Pub. No.: WO2010/004189
PCT Pub. Date: Jan. 14, 2010

(65) Prior Publication Data
US 2011/0124943 A1   May 26, 2011

(30) Foreign Application Priority Data
Jun. 30, 2008   (FR) ..................................... 08 54372

(51) Int. Cl.
*G21F 9/00*   (2006.01)
*C09D 5/44*   (2006.01)
(52) U.S. Cl.
USPC .............................................. 588/2; 523/408
(58) Field of Classification Search
None
See application file for complete search history.

(56) References Cited

U.S. PATENT DOCUMENTS

| 4,119,560 | A | * | 10/1978 | Sheeline | 588/6 |
| 4,507,363 | A | | 3/1985 | Chow et al. | |
| 4,599,195 | A | * | 7/1986 | Schafer et al. | 510/112 |
| 4,927,564 | A | * | 5/1990 | Barlou et al. | 588/5 |
| 5,091,447 | A | * | 2/1992 | Lomasney | 523/408 |
| 5,204,385 | A | * | 4/1993 | Naderhoff | 523/417 |
| 5,416,251 | A | * | 5/1995 | Lomasney et al. | 588/255 |
| 5,707,702 | A | * | 1/1998 | Brady et al. | 428/36.9 |
| 5,789,648 | A | * | 8/1998 | Roy et al. | 588/1 |
| 6,406,747 | B1 | * | 6/2002 | Biegelsen et al. | 427/213.34 |
| 6,723,890 | B2 | * | 4/2004 | Tucker et al. | 588/318 |
| 7,030,071 | B2 | * | 4/2006 | Hoffman et al. | 510/110 |
| 2005/0148740 | A1 | * | 7/2005 | Shah et al. | 525/526 |

FOREIGN PATENT DOCUMENTS

EP   1 000 957 A1   5/2000
FR   2 825 182 A1   11/2002

OTHER PUBLICATIONS

DOW Chemical "Product Safety Assessment, Bisphenol A Diglycidyl Ehter" Jun. 24, 2006.*

* cited by examiner

*Primary Examiner* — Melvin C Mayes
*Assistant Examiner* — Sheng H Davis
(74) *Attorney, Agent, or Firm* — Browdy and Neimark, PLLC

(57) ABSTRACT

The invention relates to a coating composition for the storage or containment of waste that is toxic to health and/or the environment, comprising a composition based on an epoxy resin and a curing composition free from an aromatic amine curing agent. The invention also relates to the use of this composition for the coating of said waste.

32 Claims, No Drawings

ENCAPSULATING COMPOSITION FOR THE STORAGE OF WASTE THAT IS TOXIC TO HEALTH AND/OR THE ENVIRONMENT, WHICH IS DEVOID OF AN AROMATIC AMINE HARDENING AGENT

The invention relates to an encapsulating composition for the storage or containment of waste that is toxic to health and/or the environment, comprising a composition based on epoxy resin and a hardening composition devoid of an aromatic amine hardening agent.

The invention also relates to the use of this composition for the encapsulation of said waste.

The ion-exchange resins used to purify water from nuclear installations, which after use and loss of effectiveness, have to be stored after they have fixed radioelements, therefore display a certain degree of radioactivity. Other elements used in nuclear power plants, such as magnesium bars, are also contaminated after use.

Other, in particular non-radioactive, waste such as heavy metals or materials contaminated by heavy metals needs to be contained to prevent its release into the environment.

This type of waste that is toxic to health and/or the environment, in particular radioactive waste, must stored in accordance with current safe practice.

A certain number of techniques are known for encapsulating this waste with a view to storing it, which involve the use of epoxy or polyester encapsulating resins, or also vitrification techniques which make it possible to inactivate this waste.

The application FR 2 825 182 describes a matrix system for encapsulating and storing a hazardous product, in which the encapsulating composition comprises an epoxy resin and a water-absorbing substance, making it possible to encapsulate ion-exchange resins having a high content of residual water.

A process described in the U.S. Pat. No. 4,599,196 implements a pretreatment of the cationic ion-exchange resins to reduce their acidic character, the hardening composition having to be adapted as a function of this acidity.

The U.S. Pat. No. 5,416,251 describes a method for encapsulating ion-exchange resins in which the free water is blocked by a hydrophobic agent forming a film in order to avoid the inhibition of the reaction between the resin and the hardener.

However, the encapsulating compositions, which comprise a composition based on epoxy resin and a hardening composition, can contain, as hardening agent, aromatic amines which are advised against by the current health standards or are likely to become so. In fact, some of them comprise risks classified as "CMR" (carcinogenic, mutagenic and/or toxic to reproduction). Although their use is tolerated in specific conditions of use, their substitution with products that do not have these disadvantages is being investigated.

There is therefore a need for a composition for encapsulating toxic waste which is radiation-stable, easy to handle at ambient temperature and which displays the required safety properties for matter, in particular resistance to compression and leaching, without requiring particular pretreatment of the waste to be treated, and not comprising an aromatic amine hardening agent, without the epoxy-amine reaction being affected by the presence of water and in the absence of any extra addition of specific water-absorbing agent, besides the overall epoxy-amine reaction system (i.e. except for the reactive components of the epoxy-amine system).

According to an alternative of the invention, said encapsulating composition can be free from an aromatic hardening agent.

It has now been found that the use of amidoamines as hardening agent makes it possible to obtain an encapsulating composition fulfilling these objectives and criteria.

By "amidoamine" is meant the product of the reaction between an aliphatic polyamine and a fatty acid, having terminal and/or side amine functions (amide formation with excess amine with respect to $CO_2H$).

The choice of these particular amines as hardener has several advantages:
- they are not classified among "CMR" (carcinogenic, mutagenic and/or toxic to reproduction) products or likely to be,
- the simultaneous presence of several amine functions ensures the formation of several C—N bonds with the epoxy groups of the resin, making it possible for a more compact epoxide network to form: it results in an improved stability under radiation and under systems of compression-type loads (deformation stability) and, more particularly, a resistance to compression that is not affected after exposure to ionizing radiation,
- their cross-linking kinetics, which are relatively slow and controlled (controlled reactivity), make it possible to control the reactivity during cross-linking without the reactivity of the reactive components being affected by the possible presence of water, and this being in the absence of any water-absorbing substance other than the reactive components of the epoxy-amine system,
- they can easily be implemented at ambient temperature (10-40° C., preferably 15-30° C.), because of their low viscosity, preferably less than 4 Pa·s at 25° C., and by simply mixing the components.

By "cross-linking" is meant the branching of polymer chains by chemical bridges or bonds in order to constitute a three-dimensional macromolecular network of infinite molecular weight and having different physico-chemical properties to the initial polymer. In the case of thermosetting resins, these go from a pasty state to a solid state. The cross-linking is the result of polymerization and is an irreversible process resulting in a solid, infusible and insoluble three-dimensional polymer.

In the case of epoxy resins, the cross-linking is achieved by reaction with a hardener or, more precisely, by reacting an epoxy resin composition with a hardening composition (based on amines) free of aromatic amine.

According to an alternative of the invention, said hardening composition can be devoid of an aromatic hardening agent.

The invention therefore relates, according to a first aspect, to an encapsulating composition for the storage or containment of waste that is toxic to the environment and/or health, which comprises a composition based on epoxy resin and a hardening composition, said hardening composition comprising a hardener constituted by at least one amidoamine, said encapsulating composition being devoid of an aromatic amine hardening agent.

In particular, said encapsulating composition can be devoid of an aromatic hardening agent.

Advantageously, said amidoamine is the product of the reaction between one or more polyethylene polyamine(s) (aliphatic by definition) and one or more mono- or polyunsaturated fatty acid(s), and more preferably between oligoethyleneamines and $C_{12}$-$C_{18}$ mono- or polyunsaturated fatty acids.

Said encapsulating composition must be devoid of any added water-absorbing substance besides the reactive compounds of the epoxy-amine system. In fact, the amidoamines present in the reactive composition constitute one of the reactive components of the epoxy-amine system, and can react with water, by hydrolysis, which makes it possible to overcome the problem of the influence of the free water on the curing (i.e. on the cross-linking reaction between epoxy and amine).

Preferably, the encapsulating composition comprises 50 to 80%, in particular 60 to 70%, by weight of composition based on epoxy resin and 20 to 50%, in particular 30 to 40%, by weight of the hardening composition.

Hardening Composition

The hardening composition that can be used in the encapsulating composition according to the invention advantageously comprises at least one amidoamine that is weakly reactive, i.e. having relatively slow and controlled cross-linking kinetics. Preferably, one or more amidoamine(s) having a pot life until gelation, i.e. until a viscosity approaching infinite, at 25° C. of 400 to 700 min, measured by the Gel timer method on 150 g of mixture with a bisphenol A diglycidyl ether (BADGE) epoxy resin, will be used.

Said amidoamine or said mixture of amidoamines advantageously has a viscosity at 25° C. of the order of 0.2 to 2 Pa·s.

Preferably, one or more amidoamine(s) having an amine value, corresponding to an active hydrogen equivalent weight, of the order of 90 to 110 g/H will be used.

Particularly preferred amidoamines for the purposes of the invention can be, for example, chosen from the following products, which are products of the reaction between:
- one or more polyethylene polyamine(s) (aliphatic amine(s) by definition) preferably chosen from oligoethyleneamines, and more preferably, from polyethylene tetramines and polyethylene pentamines, such as for example diethylenetriamine, triethylenetetramine, tetraethylenetetramine, tetraethylenepentamine or bis(3-aminopropyl)ethylenediamine, and
- one or more $C_{12}$-$C_{18}$ mono- or polyunsaturated fatty acid(s) (mono- and/or polyacids), such as for example oleic acid, linoleic acid, linolenic acid, palmitoleic acid or myristic acid, preferably polyunsaturated fatty acids of plant origin, such as the fatty acids of plant origin contained in the residues from wood distillation, called "Tall oil", linoleic acid and alpha- or gamma-linolenic acid being particularly preferred.

Moreover, amidoamines are likely to be found in reversible equilibrium with the imidazoline cyclized form. An amidoamine or a mixture of amidoamines rich in imidazoline(s), the reactivity of which makes it possible to regulate the rate of the cross-linking reaction and which are advantageously able to react with the water supplied by the moist waste, will preferably be used.

A preferred amidoamine for the purposes of the invention is the product of the reaction between tetraethylenepentamine and fatty acids of plant origin contained in residues from wood distillation, usually called TOFA (Tall Oil Fatty Acids).

Resin Composition

The resin composition that can be used in the encapsulating composition according to the invention is preferably chosen such that it ensures a good complementarity with the hardening composition, in particular in terms of curing kinetics and contribution to the mechanical strength of the encapsulated block of waste. This mechanical strength can be expressed in terms of resistance to compression, bending, shear, viscoelastic performance, etc.

The resin composition can comprise a mixture containing the epoxy resin as well as one or more additives, in particular chosen from reactive or plasticizing (unreactive) diluents, rheology modifiers, in particular thixotropic agents and surfactants of the ethoxylated fatty alcohols or esters of fatty acids and polyols type, having the function of emulsifier in the case of aqueous waste or of wetting agent in the case of solid waste or sequestering agents, of the EDTA (ethylenediaminetetraacetic acid) type in the case of metallic waste or waste containing metallic ions.

The epoxy resin that can be used in the encapsulating composition for the purposes of the invention is preferably an epoxy resin with an epoxy equivalent weight comprised between 190 and 210 g/mol. Said epoxy resin optionally incorporates a reactive diluent, preferably chosen from monoepoxides or multifunctional epoxides with a viscosity of less than 0.5 Pa·s at 25° C.

Preferably, said epoxy resin will have a high aromaticity content of 35 to 55%, and more preferably of 40 to 50%, expressed as the percentage of aromatic carbon atoms with respect to the total number of carbon atoms in the epoxy resin.

The number of epoxy functions, per (monomer) molecule of said epoxy resin, is advantageously 2 to 5.

Said epoxy resin will have, for example, a molar mass in g/mol of approximately 300 to 800 g/mol, which corresponds to an epoxy equivalent weight of between 125 and 225, expressed in g/mol.

A preferred epoxy resin is a resin resulting from the reaction between bisphenol A and epichlorohydrin, in particular the bisphenol A diglycidyl ether (BADGE) resin.

According to a preferred aspect of the invention, a mixture of epoxy resins with a functionality of at least 2 will be used, so as to increase the bond density (cross-linking density) during the cross-linking.

Preferably, a mixture of bifunctional epoxy resin, such as a resin resulting from the reaction between bisphenol A and/or bisphenol F and epichlorohydrin, and at least one polyfunctional resin, i.e. an epoxy resin having a number of epoxy functions per monomer that is greater than 2, such as for example epoxy resins of the novolac phenol or tris(hydroxyphenyl)methane epoxy type, etc., will be used.

The resin composition preferably comprises an epoxide diluent that is reactive (compared with amines), preferably monofunctional or polyfunctional, and more preferably with a viscosity at 25° C. of less than 0.5 Pa·s, which contributes to the reaction between the amine compounds of the hardening composition and the epoxy resin. Reactive diluents that can be used are, for example, p-tert-butylphenyl glycidyl ether, cresyl glycidyl ether, ethylhexyl glycidyl ether or triepoxide such as trimethylolpropane triglycidyl ether, glycerol triglycidyl ether. Preferably, an aromatic diluent, in particular p-tert-butylphenyl glycidyl ether, will be used.

The choice of an aromatic diluent advantageously makes it possible to increase the aromaticity content of the polymer and consequently the resistance to radiation of the encapsulating composition.

The resin composition can also comprise, if appropriate, a plasticizing (unreactive) diluent preferably chosen from solvents that are heavy, i.e. having a molecular weight of 140 to 600 g/mol, and preferably 140 to 500 g/mol and are hydrophobic and miscible with the hardening amines.

These compounds make it possible to prevent the encapsulated block of waste from cracking during thermal shocks and to adjust the viscosity of the hardening composition, as well as to prevent the exudation of residual water and to make the encapsulating composition impermeable (resistance to leaching).

For example, a compound chosen from heavy glycol ethers, such as tripropylene glycol methyl ether; aromatic esters, such as benzyl acetate; benzyl oxide; $C_8$-$C_{12}$ alkyl phthalates, in particular isononyl or isoundecyl phthalate and mixtures thereof, will be used as plasticizing diluent compound.

The resin composition of said encapsulating composition according to the invention advantageously comprises a thixotropic agent which makes it possible to control the decrease in viscosity, in particular at the start of the reaction, and contributes to control of the exothermicity.

Preferably, a hydrophobic thixotropic agent will be used which makes it possible in particular to obtain homogeneously encapsulated waste, by limiting the increase of the waste in the encapsulating composition when it is light, for example in the case of ion-exchange resins.

Hydrophobic thixotropic agents that can be used can be chosen for example from hydrophobic pyrogenic silica and modified organophilic clay as obtained by modification by grafting of an hydrophobic organic grafting agent.

Depending on the nature of the waste to be encapsulated, the resin composition can also comprise one or more surfactant(s) or sequestering agent(s), as described above.

In particular, in the case of the encapsulating of ion-exchange resins, a surfactant will be used to improve cohesion by a better wetting and a better adhesion between the encapsulating composition and the ion-exchange resin to be encapsulated. In this case, a non-ionic surfactant, in particular a hydrophilic non-ionic surfactant that is not diluted in water (anhydrous), such as for example those chosen from ethoxylated fatty alcohols and siloxane polyethers, will preferably be used.

In the case of other waste to be encapsulated, in particular for encapsulating metals, a suitable sequestering or complexing agent comprising groups which interact with the metallic element to be encapsulated, for example —$CO_2H$ groups, such as EDTA, will be used.

The type of surfactant or sequestering agent to be included in the resin composition can vary depending on requirements and the desired effect.

Preferably, the resin composition comprises, relative to the total weight of the resin composition:
- 70 to 90% by weight of an epoxy resin or of an epoxy resin mixture, preferably 85 to 90%,
- 5 to 15% by weight of a reactive diluent, preferably 8 to 12%,
- 5 to 15% by weight of a plasticizing diluent, preferably 5 to 10%,
- 0 to 3% by weight of a thixotropic agent, preferably 1 to 2%, and
- 0 to 2% of at least one surfactant or sequestering agent, the sum of the components of the resin composition not exceeding 100%.

Optionally, a reinforcing additive that makes it possible to improve the mechanical properties as well as the resistance to radiation of the encapsulated block of waste, for example at the rate of 0 to 10% by total weight of the encapsulating composition, can also be added to the encapsulating composition, after mixing the hardening composition and the resin composition.

For example short glass fibres, carbon fibres, ceramic fibres or synthetic organic fibres can be used, glass fibres, carbon fibres and ceramic fibres being preferred. The choice of the type of reinforcing material or additive will depend on the level of the sought resistance properties.

The invention also relates to the use of an encapsulating composition as defined above for the preparation of an encapsulated block of waste, as well as the thus-obtained encapsulated block of waste.

In particular, said encapsulated block of waste can comprise 30 to 60% by weight of encapsulating composition and 70 to 40% by weight of waste.

Said encapsulated block of waste can be prepared by a method comprising the steps consisting of:
i) preparing an encapsulating composition by mixing a resin composition and a hardening composition as defined above, and
ii) incorporating the waste to be encapsulated into said encapsulating composition, and
iii) encapsulating and cross-linking until an encapsulated and cured block of waste is obtained.

Optionally, a reinforcing additive will be added to the encapsulating composition in an intermediate stage taking place before the incorporation of waste to be encapsulated and after the preparation of the encapsulating composition.

The resin composition and the hardening composition can be mixed, for example, at a temperature of 15 to 30° C. If necessary, the resin composition, on the one hand, and the hardening composition, on the other hand, can be heated or cooled before mixing, in particular to a temperature of 20 to 25° C.

The waste to be encapsulated can be waste in solid form, optionally divided, or in semi-liquid form such as a slurry or a viscous paste.

In particular, the encapsulating composition can be used to store or contain radioactive waste such as for example anionic or cationic ion-exchange resins and mixtures thereof, contaminated magnesium bars, irradiated metallic parts such as parts irradiated by a low or medium radioactivity or radioactive ash. The composition according to the invention is therefore particularly useful and used for the encapsulating and storage and/or the containment of waste that is toxic to health and/or the environment.

The encapsulating composition can alternatively be used to store or contain non-radioactive toxic wastes, such as for example heavy metals or materials containing them, divided metallic parts originating from the dismantling of industrial plants or products that generate or release harmful substances such as dioxin, phosgene, $NH_3$, morpholine, hydrazine, $SO_2$ or $SO_3$.

The waste encapsulated by the encapsulating composition according to the invention, in the form of a block, has high resistance properties to compression, as well as a good chemical resistance to attack from acidic or basic agents, or oxidizing agents, from light, as well as a high resistance to leaching. It has a good mechanical performance under compression, in particular after exposure to an ionizing radiation, as well as a shear strength, with excellent dynamic mechanical performance.

The invention is illustrated non-limitatively by the following examples.

EXAMPLE 1

Preparation of an Encapsulating Composition

The following encapsulating composition was prepared:
1) Epoxy resin composition

| Component | Content (in % by weight) |
|---|---|
| Bisphenol A diglycidyl ether (BADGE) epoxy resin functionality f = 2 | 77.8 |
| Novolac phenol epoxy resin (with an epoxy equivalent weight of 170-180 g/mol) f > 2 | 9.85 |
| p-tert-butylphenyl glycidyl ether (reactive diluent) | 10.85 |

-continued

| Component | Content (in % by weight) |
|---|---|
| Hydrophobic pyrogenic silica (thixotropic agent) | 1.5 |

2) Hardening composition with 50 p of hardener composition per 100 p of epoxy resin composition (i.e. 33.3% of hardener)

| Component | Content (in % by weight) |
|---|---|
| Product of the reaction between tetraethylenepentamine and fatty acids of plant origin contained in residues from wood distillation (TOFA) (Ancamide 506 from AIR PRODUCTS) | 100 |

The mixture was produced by mixing the resin composition with the hardening composition, which had previously been measured out and brought to a temperature of 20 to 25° C., for 5 to 10 min at ambient temperature comprised between 15 and 30° C. The waste to be encapsulated is incorporated immediately after the mixing.

EXAMPLE 2

Encapsulating an Ion-Exchange Resin 58 kg of epoxy resin composition and 28 kg of hardening composition from Example 1 are mixed in a 200 litre metal drum.

The mixture is mixed using a mixing rotor with a diameter of 520 mm in a single stage and 4 blades with a width of 200 mm oriented at 45°, with a stirrer at a speed of 60 revolutions/min for 1 to 2 min.

119 kg of ionically balanced polystyrenic or acrylic ion-exchange resins (Amberlite MB20 from ROHM&HAAS) are then immediately introduced, under stirring, into the mixture at a rate of 500 kg/h, then the whole is mixed for 7 min at 60 revolutions/min, then for 7 min at 140 revolutions/min.

After a pause of 5 min for degassing, the mixture is homogenized for 5 min at 140 revolutions/min.

A 205-kg block of encapsulated ion-exchange resin is obtained.

The performance of the thus-obtained block of encapsulated ion-exchange resin in terms of resistance to compression after exposure to ionizing radiation meets the specifications of the Agence nationale de gestion des déchets radioactifs [National Agency for the Management of Radioactive Waste] (ANDRA).

The ANDRA specification requires a loss of resistance to compression after exposure to ionizing radiation of less than 20%.

The results obtained with the test performed according to Example 2, which is representative of the present invention, show that, after an exposure of 20 days to gamma radiation with an average dose rate of 182 gray/h, not only is there no loss of resistance to compression after exposure in the case of the encapsulated waste according to the present invention, but on the contrary there is a significant gain in said resistance after exposure which is 18%, compared with the corresponding value before exposure.

The invention claimed is:

1. Encapsulating composition for the storage or containment of waste that is toxic to the environment and/or health, wherein said encapsulating composition comprises 50 to 80% by weight of a resin composition based on epoxy resin and 20 to 50% by weight of a hardening composition comprising a hardener constituted by at least one amidoamine, said hardening composition being devoid of aromatic amine hardening agent and in that the hardening composition comprises a hardener constituted by at least one amidoamine chosen from the products of the reaction between one or more aliphatic polyethylene polyamine(s) and one or more $C_{12}$-$C_{18}$ mono- or polyunsaturated fatty acid(s), and in that said epoxy resin has an aromaticity content of the order of 40 to 50% and in that said composition is devoid of any other water-absorbing substance, apart from the reactive components of the epoxy-amine system,
    wherein the resin composition comprises at least one additive which is a reactive diluent and is selected from the group consisting of p-tert-butylphenyl glycidyl ether, cresyl glycidyl ether, ethylhexyl glycidyl ether, trimethylolpropane triglycidyl ether and glycerol triglycidyl ether.

2. Composition according to claim 1, wherein said hardening composition is devoid of aromatic hardening agent.

3. Composition according to claim 1, wherein the aliphatic polyethylene polyamine is chosen from polyethylene tetramines and polyethylene pentamines.

4. Composition according to claim 1, wherein the aliphatic polyethylene polyamine is selected from the group consisting of diethylenetriamine, triethylenetetramine, tetraethylenetetramine, tetraethylenepentamine or bis(3-aminopropyl)ethylenediamine.

5. Composition according to claim 1, wherein the resin composition comprises an epoxy resin with an epoxy equivalent weight comprised between 190 and 210 g/mol.

6. Composition according to claim 1, wherein the resin composition comprises an epoxy resin with an epoxy equivalent weight comprised between 190 and 210 g/mol and the number of epoxy functions per (monomer) molecule of said epoxy resin is 2 to 5.

7. Composition according to claim 1, wherein the resin composition comprises an epoxy resin with an epoxy equivalent weight comprised between 190 and 210 g/mol and said epoxy resin is a resin resulting from the reaction between bisphenol A and/or bisphenol F and epichlorohydrin.

8. Composition according to claim 1, wherein a mixture of bifunctional epoxy resin and at least one polyfunctional epoxy resin with a functionality greater than 2, is used as epoxy resin.

9. The composition of claim 8 wherein the functionality is from 2 to 5.

10. Composition according to claim 1, wherein a mixture of resin resulting from the reaction between bisphenol A and/or bisphenol F and epichlorohydrin and at least one polyfunctional resin is used as epoxy resin.

11. Composition according to claim 1, wherein the resin resulting from the reaction between bisphenol A and epichlorohydrin is the bisphenol A diglycidylether (BADGE) resin.

12. Composition according to claim 1, wherein the epoxy resin composition comprises at least one additive selected from the group consisting of reactive or plasticizing diluents, hydrophobic thixotropic agents, surfactants and sequestering agents.

13. Composition according to claim 1, wherein the epoxy resin composition comprises at least one additive which is a plasticizing diluent selected from the group consisting of heavy glycol ethers, aromatic esters, benzyl oxide, $C_8$-$C_{12}$ alkyl phthalates and mixtures thereof.

14. Composition according to claim 1, wherein the epoxy resin composition comprises at least one additive which is a hydrophobic thixotropic agent selected from the group consisting of hydrophobic pyrogenic silica and modified organophilic clay.

15. Composition according to claim 1, wherein the epoxy resin composition comprises at least one additive which is a non-ionic surfactant.

16. Composition according to claim 1, further comprising a reinforcing material selected from the group consisting of short glass fibres, carbon fibres, ceramic fibres and synthetic organic fibres.

17. Composition according to claim 1, wherein the resin composition comprises, relative to the total weight of the resin composition:
   70 to 90% by weight of an epoxy resin or of an epoxy resin mixture,
   5 to 15% by weight of a reactive diluent,
   5 to 15% by weight of a plasticizing diluent,
   0 to 3% by weight of thixotropic agent, and
   0 to 2% of at least one surfactant or sequestering agent,
   the sum of the components of the resin composition not exceeding 100%.

18. The composition of claim 17 which comprises
   85-90% by weight of said epoxy resin or epoxy resin mixture,
   8-12% by weight of said reactive diluent,
   5-10% by weight of said plasticizing diluent, and
   1-2% by weight of said thixotropic agent.

19. The composition of claim 1, wherein said composition comprises a reactive, aromatic epoxide diluent.

20. The composition of claim 19, wherein said reactive, aromatic epoxide diluent has a viscosity of less than 0.5 Pa·s at 25° C.

21. The composition of claim 1, wherein said composition is capable of being mixed with radioactive waste and, if the mixture is cured, of forming a product in which said radioactive waste is encapsulated, such that said product does not lose resistance to compression as a result of 29 days exposure to gamma radiation at an average dose rate of 182 gray/h.

22. A process for the preparation of an encapsulated block of waste, comprising incorporating the waste to be encapsulated into the encapsulating composition according to claim 1.

23. A process for the preparation of an encapsulated block of waste, comprising incorporating the waste to be encapsulated into encapsulating composition according to claim 1, wherein said encapsulated block of waste comprises 30 to 60% by weight of encapsulating composition and 70 to 40% by weight of waste.

24. A process for the preparation of an encapsulated block of waste comprising incorporating the waste to be encapsulated into encapsulating composition according to claim 1, wherein said encapsulated block of waste is prepared by a method comprising the steps consisting of:
   preparing an encapsulating composition by mixing the resin composition and the hardening composition, and
   (ii) incorporating the waste to be encapsulated into said encapsulating composition, and
   (iii) encapsulating and cross-linking until an encapsulated and cured block of waste is obtained.

25. A process for the preparation of an encapsulated block of waste, comprising incorporating the waste to be encapsulated into the encapsulating composition according to claim 1, wherein said encapsulated block of waste is prepared by a method comprising the steps consisting of:
   (i) preparing the encapsulating composition by mixing the resin composition and the hardening composition, and
   (ii) incorporating the waste to be encapsulated into said encapsulating composition, and
   (iii) encapsulating and cross-linking until an encapsulated and cured block of waste is obtained,
and wherein a reinforcing additive is added to the encapsulating composition before the incorporation of waste to be encapsulated.

26. A process for the preparation of an encapsulated block of waste, comprising incorporating the waste to be encapsulated into the encapsulating composition according to claim 1, wherein said encapsulated block of waste is prepared by a method comprising the steps consisting of:
   (i) preparing an encapsulating composition by mixing the resin composition and the hardening composition, and
   (ii) incorporating the waste to be encapsulated into said encapsulating composition, and
   (iii) encapsulating and cross-linking until an encapsulated and cured block of waste is obtained, and
   wherein the resin composition and the hardening composition are mixed at a temperature of 15 to 30° C.

27. A process for the preparation of an encapsulated block of waste, comprising incorporating the waste to be encapsulated into the encapsulating composition according to claim 1 wherein the waste to be encapsulated is in solid form or in semi-liquid form.

28. A process for the preparation of an encapsulated block of waste, comprising incorporating the waste to be encapsulated into the encapsulating composition according to claim 1, wherein the waste to be encapsulated is radioactive or non-radioactive waste.

29. A process for the preparation of an encapsulated block of waste, comprising incorporating the waste to be encapsulated into the encapsulating composition according to claim 1, wherein said waste is chosen from anionic or cationic ion-exchange resins and mixtures thereof, contaminated magnesium bars, irradiated metallic parts and radioactive ash.

30. A process for the preparation of an encapsulated block of waste, comprising incorporating the waste to be encapsulated into the encapsulating composition according to claim 1, wherein said waste is chosen from heavy metals or materials containing them, divided metallic parts originating from the dismantling of industrial plants and products that generate or release harmful substances.

31. A process for the preparation of an encapsulated block of waste, comprising incorporating the waste to be encapsulated into the encapsulating composition according to claim 1, wherein it involves the encapsulating and storage and/or containment of waste that is toxic to health and/or the environment.

32. An encapsulated block of waste comprising solid or semi-liquid waste incorporated into a resin matrix, said article obtained by mixing waste with the composition of claim 1 and curing the mixture.

* * * * *